(12) United States Patent
Batten et al.

(10) Patent No.: US 7,367,459 B2
(45) Date of Patent: May 6, 2008

(54) PASSIVE GREASE TRAP USING SEPARATOR TECHNOLOGY

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 93 days.

(21) Appl. No.: 11/413,034

(22) Filed: Apr. 27, 2006

(65) Prior Publication Data

US 2007/0251879 A1 Nov. 1, 2007

(51) Int. Cl.
*B01D 17/025* (2006.01)
(52) U.S. Cl. .............. 210/521; 210/532.1; 210/538
(58) Field of Classification Search ........... 210/521, 210/532.1, 532.2, 538, 540
See application file for complete search history.

(56) References Cited

U.S. PATENT DOCUMENTS

| | | | |
|---|---|---|---|
| 978,889 A * | 12/1910 | Imhoff | 210/532.2 |
| 1,200,951 A * | 10/1916 | Kelly, Jr. | 210/540 |
| 2,213,458 A * | 9/1940 | Buckley | 210/532.2 |
| 2,226,968 A * | 12/1940 | Clerici | 210/532.1 |
| 3,224,593 A | 12/1965 | Nebolsine | 210/519 |
| 4,372,854 A | 2/1983 | Szereday | 210/242.3 |
| 4,385,986 A | 5/1983 | Jaisinghani et al. | 210/123 |
| 4,406,789 A | 9/1983 | Brignon | 210/519 |
| 4,451,366 A | 5/1984 | Smisson | 210/209 |
| 4,554,074 A | 11/1985 | Broughton | 210/519 |
| 4,938,878 A | 7/1990 | Hall | 210/744 |
| 4,985,148 A | 1/1991 | Monteith | 210/519 |
| 5,021,153 A | 6/1991 | Haws | 210/221.2 |
| 5,178,754 A | 1/1993 | Batten et al. | 210/138 |
| 5,225,085 A | 7/1993 | Napier et al. | 210/705 |
| 5,405,538 A | 4/1995 | Batten | 210/744 |
| 5,453,187 A | 9/1995 | Plumb | 210/202 |
| 5,505,860 A | 4/1996 | Sager | 210/519 |
| 5,560,826 A | 10/1996 | Szereday et al. | 210/522 |
| 5,565,101 A | 10/1996 | Kuntz | 210/304 |
| 5,714,069 A | 2/1998 | Sager | 210/519 |
| 5,718,824 A * | 2/1998 | Kannan et al. | 210/521 |
| 5,725,760 A | 3/1998 | Monteith | 210/170 |
| 5,730,872 A | 3/1998 | Rhodes | 210/519 |
| 5,746,911 A | 5/1998 | Pank | 210/170 |
| 5,849,181 A | 12/1998 | Monteith | 210/163 |
| 5,861,098 A | 1/1999 | Morrison | 210/774 |
| 5,993,646 A | 11/1999 | Powers | 210/86 |
| 6,068,765 A | 5/2000 | Monteith | 210/170 |
| 6,238,572 B1 | 5/2001 | Batten | 210/739 |

(Continued)

FOREIGN PATENT DOCUMENTS

DE 19907840 A1 8/2000

(Continued)

*Primary Examiner*—Christopher Upton
(74) *Attorney, Agent, or Firm*—MacCord Mason PLLC (57) ABSTRACT

A grease trap for separating grease and solid waste from waste water. The grease trap includes a tank having a downwardly shaped bottom. An upwardly shaped divider divides the tank into an upper chamber and a lower chamber. A hole near an upper part of the divider allows waste into the upper chamber. An inlet invert in the tank receives incoming waste water, while an outlet invert removes water from the tank. A lid covers the tank. A pipe extends through the lid, upper chamber, and lower chamber for sucking solid waste out of the lower chamber.

18 Claims, 10 Drawing Sheets

U.S. PATENT DOCUMENTS

| | | |
|---|---|---|
| 6,413,435 B1 | 7/2002 | Kyles et al. ................. 210/800 |
| 6,475,381 B1 * | 11/2002 | Gustafsson ................. 210/521 |
| 6,517,715 B1 | 2/2003 | Batten et al. ............... 210/232 |
| 6,645,387 B2 | 11/2003 | Naski et al. ................. 210/744 |
| 6,730,222 B1 | 5/2004 | Andoh et al. ............... 210/304 |
| 6,849,176 B1 | 2/2005 | Batten et al. ................. 210/97 |
| 6,951,615 B2 | 10/2005 | Tripodi et al. .............. 210/744 |
| 6,951,619 B2 | 10/2005 | Bryant ....................... 210/788 |
| 2005/0016937 A1 | 1/2005 | Smullin ...................... 210/800 |

FOREIGN PATENT DOCUMENTS

| | | |
|---|---|---|
| WO | WO00/66242 A | 11/2000 |

* cited by examiner

PASSIVE GREASE TRAP USING SEPARATOR TECHNOLOGY

BACKGROUND OF THE INVENTION

Historically, grease traps have been used in restaurants and other commercial facilities to limit the amount of grease and solid waste that it carried into sewer systems via waste water. Typical grease trap are either passive grease traps or automatic grease traps. Passive grease traps are usually only emptied of the waste periodically and therefore waste tends to build up inside the tank. Passive grease traps typically include a tank with an inlet that brings in waste water and an outlet that carries water out of the system. Lightweight grease rises to the top of the tank and heavier solids settle in the bottom of the tank. A problem with many grease traps is that water may flush through the system with such velocity that it disrupts the grease that has already separated, causing the waste to be expelled with grey water. This is especially true as the tank fills up with grease, so that the grease/water interface is closer to the grease trap bottom.

As such, present grease traps, though effective to remove some grease and solid waste from solids containing liquids, do not adequately prevent grease from going downstream with the water. Thus there remains a need for a low cost, more effective grease trap for removing solids and grease from wastewater.

SUMMARY OF THE INVENTION

The present invention fulfills one or more of these needs in the art by providing a grease trap for separating waste from waste water. The grease trap includes a tank having a downwardly shaped bottom. An upwardly shaped divider divides the tank into an upper chamber and a lower chamber. A hole near an upper part of the divider allows low specific gravity waste into the upper chamber. A pipe extends it own through the trap to enable suction to be applied to the lower chamber, typically extending through the hole. Preferably, the diameter of the hole in the upwardly shaped divider is larger than the diameter of the vertical pipe to allow lightweight grease to flow into the upper chamber from the lower chamber. An inlet invert in the tank receives incoming waste water, while an outlet invert removes water from the tank. Preferably, the outlet invert includes a weep hole. In an embodiment, a lid covers the tank, and the pipe extends through the lid and through the upper chamber and into the lower chamber to suck solid waste out of the lower chamber. The grease trap may include a vent for venting gases. The lightweight grease is removed from the upper chamber by applying suction to the pipe long enough to suck all of the flowable contents out of the tank.

In an embodiment, the tank is roto-molded plastic. Preferably, the upwardly shaped divider is positioned above an inlet invert opening and an outlet invert opening, and the upwardly shaped divider and the downwardly shaped bottom of the outer tank diverge so waste water entering the lower chambers encounters an enlarging volume. The inner upwardly shaped divider may include at least one sidewall suspending the divider from an upper part of the tank to form the chambers.

In an embodiment, the grease trap may include a support base for installing the grease trap on a floor. The support base is sized and configured to receive the downwardly shaped bottom of the tank. The support base includes support rods extending upwardly from the base for supporting the tank.

The present invention also provides a method of separating lightweight grease and heavy solids from waste water. The method includes assembling a grease trap having an internal divider for creating two chambers, and passing waste water through the grease tank. The method may also include pumping out lightweight grease and heavy solids from the two chambers.

In an embodiment, the method includes molding an outer tank unitary with an inlet invert, an outlet invert, and downwardly shaped bottom. The method also includes molding an inner tank with an upwardly shaped bottom having a hole and configured for insertion in the outer tank and around the inlet invert and outlet invert of the outer tank. The inner tank is then inserted into the outer tank, and a pipe is inserted through the inner tank, the hole in the upwardly shaped bottom, and into the outer tank.

In an embodiment, the method includes the steps of molding an outer tank having a downwardly shaped bottom, installing an inlet invert and an outlet invert in the outer tank, and molding an upwardly shaped divider having a central hole configured for insertion in the outer tank and around the inlet invert and outlet invert of the outer tank. The method includes inserting the upwardly shaped divider inside the outer tank to define an upper chamber above the divider and a lower chamber below the divider, and inserting a pipe through the hole of the divider and into the lower chamber.

In another embodiment, a method of separating lightweight grease and heavy solids from wastewater includes supplying the wastewater into a grease trap through an inlet invert opening into a lower chamber, and allowing grey water to exit the grease trap through an outlet invert, thereby establishing at least intermittent currents from the inlet invert to the outlet invert. The method may include allowing grease in the waste water to rise by gravity from the lower chamber through a hole in a divider into an upper chamber so the grease is sequestered in the upper chamber and protected from entrainment in currents of grey water, and allowing heavy solids in the waste water to fall by gravity to a sump in the lower chamber. Finally, the method may include removing collected grease and heavy solids from the grease trap.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
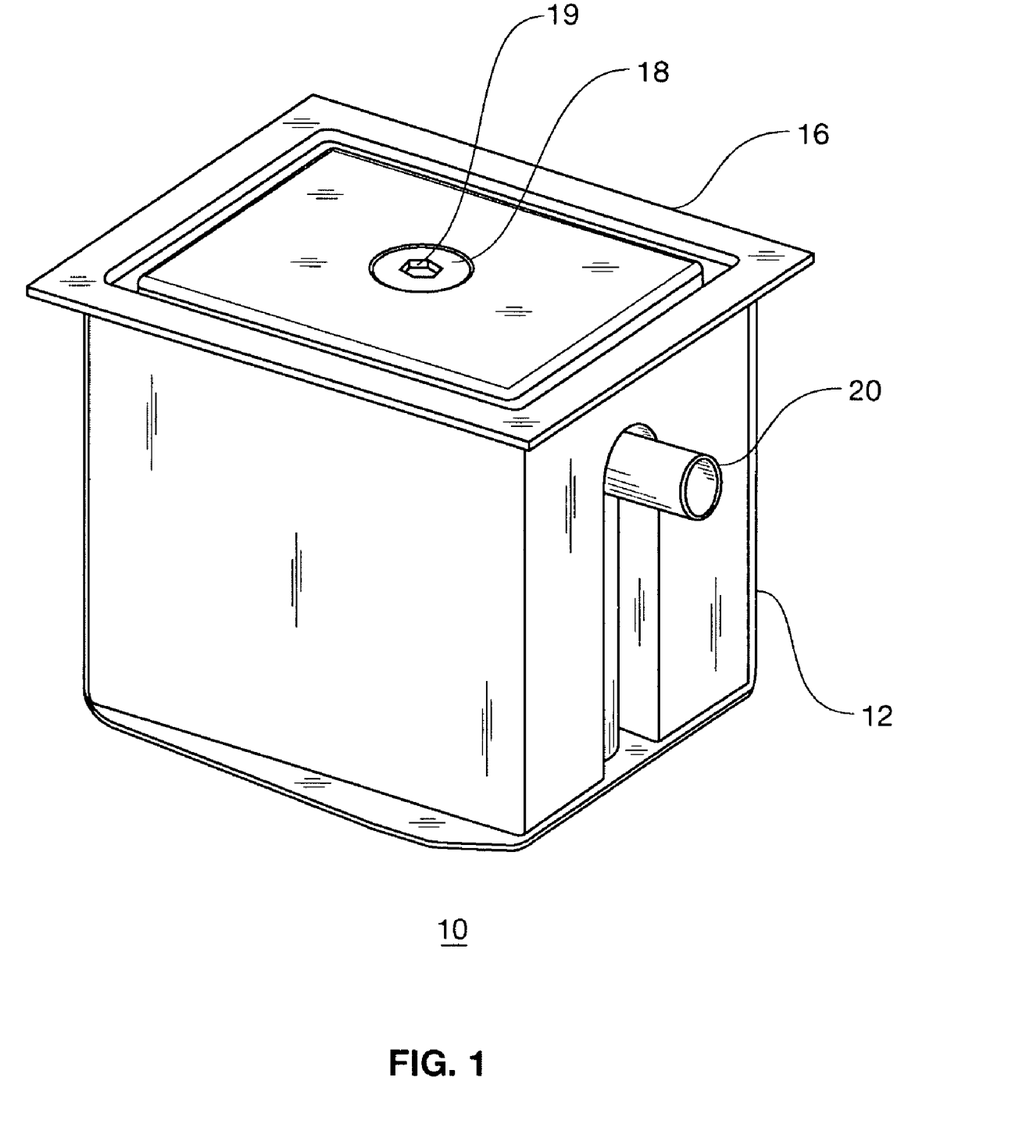
FIG. 1 is a perspective view of a grease trap for separating grease and heavy solids from solids containing liquids constructed according to first embodiment of the invention.
Figure 2:
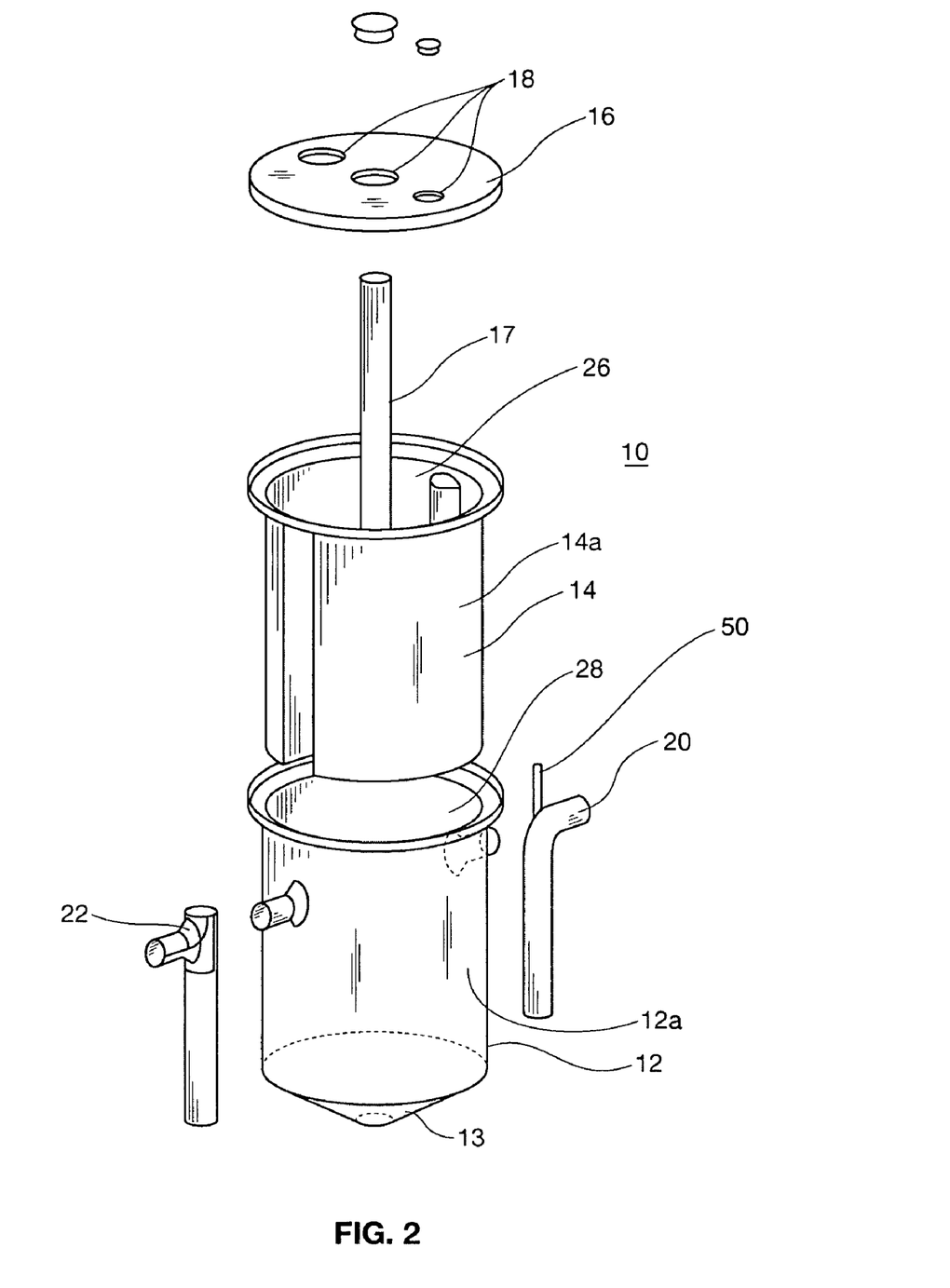
FIG. 2 is an exploded view of the grease trap constructed according a second embodiment of the invention.

FIG. 1 shows a grease trap 10 for separating solids and grease from waste water. The grease trap 10 includes an outer tank 12 with a downwardly shaped bottom 13, as seen in FIG. 2. In this embodiment, the downwardly shaped bottom is shaped like an inverted pyramid, but other shapes such as a conical shape, bowl shape, slanted plane, or the like, can be used. Preferably, the lowermost portion is centrally located, but that is not critical. As seen in FIG. 1, an inlet invert 20 is provided for connecting to a waste water source, such as a kitchen sink drain, allowing waste water to flow into the outer tank 12. The grease trap also 10 includes a tank lid 16. The tank lid 16 includes an outlet port 18 provided with a removable closure 19. The outlet port 18 allows for the connection of a pipe through which solids and grease may be sucked out of the grease tank 10. Other outlet ports may be provided to vent gases, selectively remove heavy solids from the downwardly shaped bottom 13 of the outer tank 12, or selectively remove grease trapped in the upper chamber 26, as seen in FIG. 4.

In a second embodiment, as seen in FIG. 2 in exploded view, the grease trap 10 includes an outer tank 12 with a downwardly shaped bottom 13. An inner tank 14 is inserted into the outer tank 12 such that there is very little space, if any, between the walls 14a of the inner tank 22 and the walls 12a of the outer tank 12. The second embodiment differs from the first in being based on a circular geometry versus the rectangular shape of the first embodiment. Of course, other shapes such as pentagonal, trapezoidal, triangular, or even free form could be used.

Figure 4:
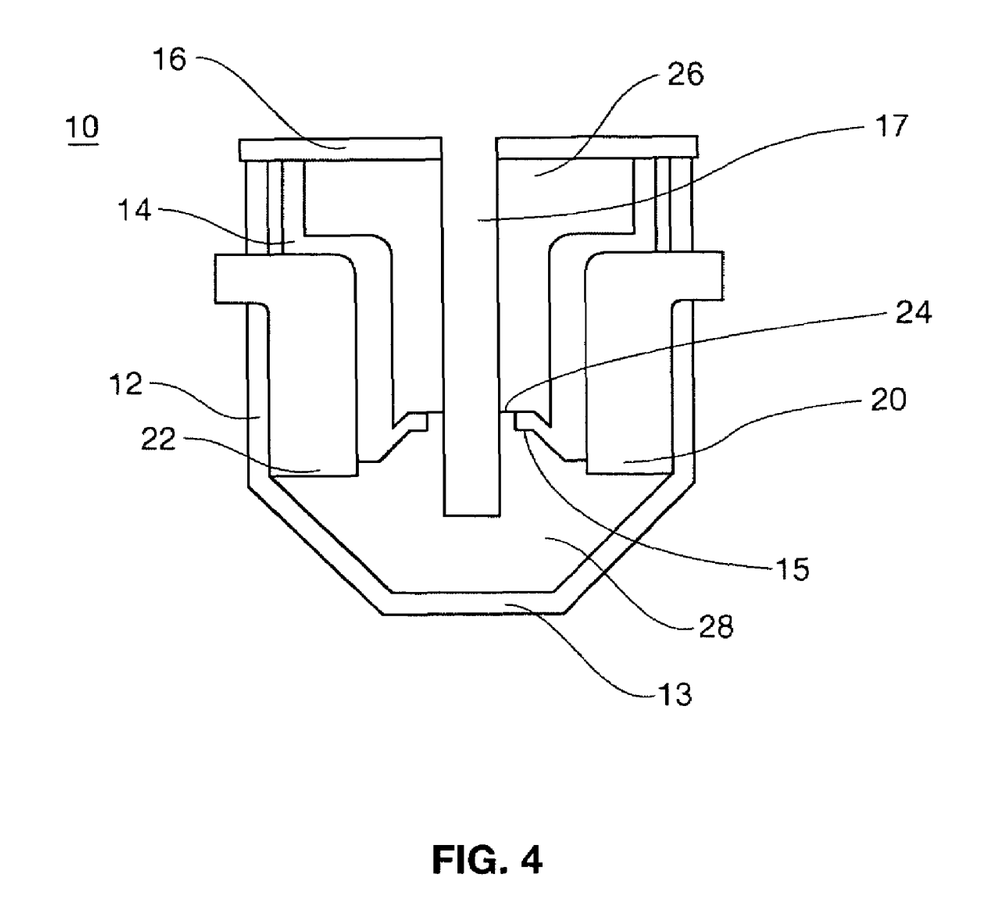
FIG. 4 is cross-sectional view of an embodiment of the grease trap constructed according to the first embodiment of the invention.

The inner tank 22 has an upwardly shaped bottom 15, as best seen in FIG. 4, so that the bottom 15 of the inner tank 14 and the downwardly shaped bottom 13 of the outer tank 12 diverge. The upwardly shaped bottom 15 divides the outer tank 12 into an upper chamber 26 where lightweight grease collects, and a lower chamber 28 where heavy solids may settle.

In use, the diverging upwardly shaped bottom 15 and the downwardly shaped bottom 13 aid in the separation of grease and solid waste from water. As water, oil, and grease flow into this area through the inlet invert 20, the velocity slows to its slowest point at the position of greatest separation between the upwardly shaped bottom 15 and the downwardly shaped bottom 13. This is where the cross-sectional area that the water current encounters is the greatest. This concept of increasing residence time and enabling greater separation by a greater cross-section is disclosed in U.S. Pat. No. 6,238,572 to Batten, the entire disclosure of which is hereby incorporated by reference. The slower the velocity of the fluid, the greater the probability that the lightweight grease can separate from the water and rise to the apex of the upwardly shaped bottom 15 and eventually through the central hole 24 in the upwardly shaped bottom. After passing the position of greatest divergence, the velocity can increase as the fluid makes its way from the center to the outlet invert 22.

Preferably, the inner tank 14 and the outer tank 12 are roto-molded plastic. In some cases, the inlet invert, outlet invert, and outer tank are can be molded as one piece. However, the grease tank 10 may be made of metal, and the parts may be welded together or joined by other fasteners.

As seen in FIG. 2, in a cylindrical embodiment, the inlet invert may include a vent 50 for venting gases from the grease trap 10. The vent 50 may be hooked up to an external ventilation system to prevent odors from escaping the grease tank 10 into interior areas if the grease trap is installed in a building.

The inner tank 14 as best seen in FIG. 2, is roto-molded such that the inner tank 14 slides into place over the inlet invert 20 and the outlet invert 22 that lead into and out of the outer tank 12. As such, the inner tank 14 can be removed without disturbing the invert pipes leading in and out of the grease trap 10.

Figure 3:
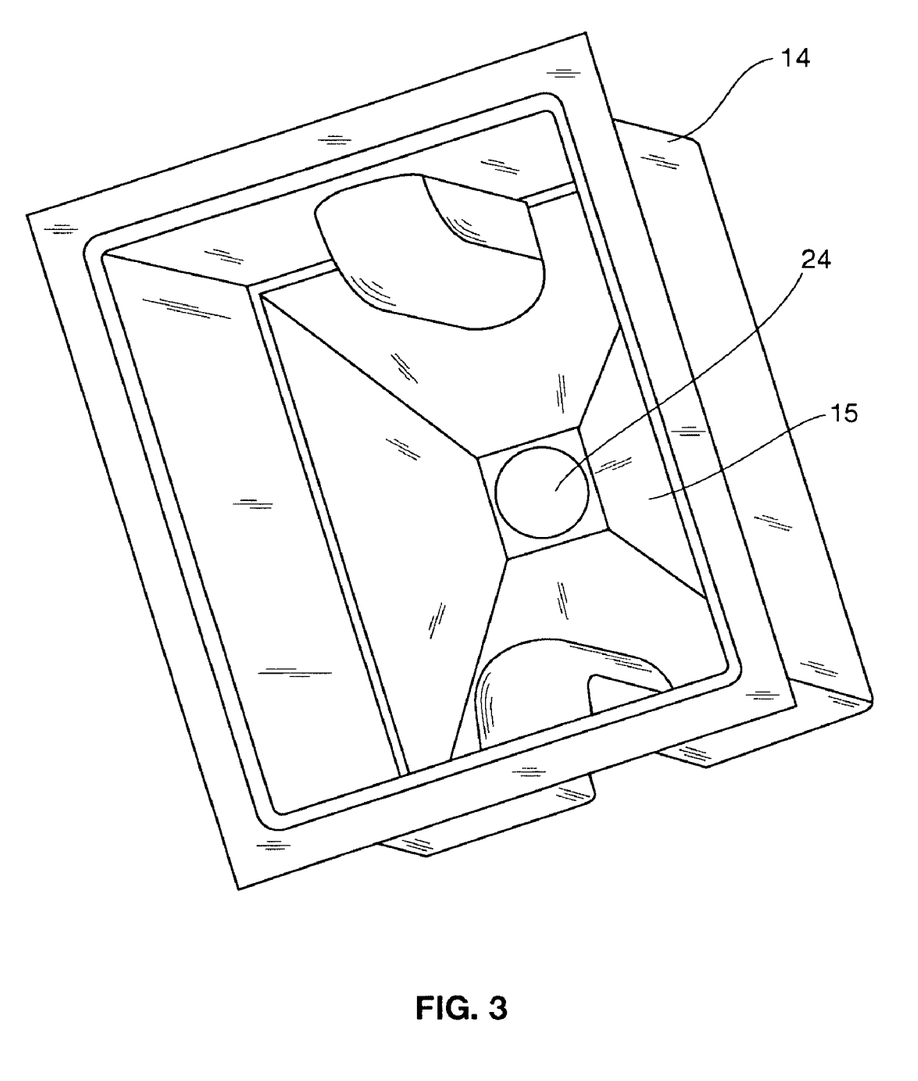
FIG. 3 is an interior view of the inner tank of the grease trap constructed according to the first embodiment of the invention.

In the preferred embodiment, the inner tank 14 has thin walls 14a to cut down on the cost of materials used to manufacture the inner tank 14. The walls of the inner tank 14 help support the upwardly shaped bottom 15, as seen in FIGS. 3 and 4. The cylindrical shape of the FIG. 2 embodiment is stronger than the rectangular shape, but the grease tank may also be square, rectangular, or other shapes.

As mentioned above, the inlet invert 20 and outlet invert 22 can be molded as part of the outer tank 12. However, the inlet invert 20 and the outlet invert 22 may be separate parts. The inner tank 22 is roto-molded such that the inner tank 22 can slide into place over and around the inlet and outlet inverts 14, 15 of the outer tank 12 without disturbing the plumbing fittings to the inverts. Likewise, the inner tank 22 may be subsequently removed without disturbing the plumbing.

In a preferred embodiment the exit port end of the inlet invert 20 needs to be as high as possible to maximize the storage space in the downwardly shaped bottom 13. If the inlet invert 20 is not above the static level of the solids layer, the solids layer may be disturbed as wastewater flows into the lower chamber 28 via the inlet invert 20.

As seen in FIGS. 2 and 4, a pipe 17 extends from the outlet 18 in the lid 16 through the upper chamber 26 of the inner tank 14, and extends through the hole 24 located in the upwardly shaped bottom 15 of the inner tank 14. Preferably, the pipe 17 has a smaller diameter than the hole 24 so that lightweight grease may flow into the inner tank 14 through the space between the hole 24 and the pipe 17 inserted therein.

FIG. 4 is a cross-sectional view of the grease trap 10 showing the downwardly shaped bottom 13 of the outer tank 12 diverging from the upwardly shaped bottom 15 of the inner tank 14.

In operation, waste water enters the grease tank 10 via the inlet invert 20. The water flows into the diverging space between the upwardly shaped bottom 15 and the downwardly shaped bottom 13. Since the upwardly shaped bottom 15 and the downwardly shaped bottom 13 diverge from the edge of the tank to the center of the tank, as waste water flows into the diverging area, the velocity of the water flow slows, allowing the grease to rise under the influence of gravity, since it is less dense than the water. Heavy solids sink to the bottom of the downwardly shaped bottom 13. Lightweight greases gather at the upwardly shaped bottom 15 and float through the central hole 24 into the inner tank 14 as seen in FIG. 4. Since the lightweight greases gather at a location outside of the flow path, less grease are allowed to pass back out of the grease tank via the outlet invert 22. The upwardly shaped bottom 15 provides a barrier that sequesters the grease that has become trapped in the inner tank 14 from the flow of grey water from the inlet 30 to the outlet 22. Thus the grey water current does not entrain the sequestered grease and sweep it out of the grease trap via the outlet invert 22. The vertical, internal pipe 17 passes through the upwardly shaped divider 15 so that the heavy solids collecting in the downwardly shaped bottom 13 may be pumped out. Continued pumping draws water from the tank, and pulls the grease back down to the lower chamber and out through the pipe 17. The pipe 17 need not be strictly vertical, but could be slanted or have horizontal elements, as long as it leads from the lower chamber 28 to enable pumping of solids and grease.

Figure 5:
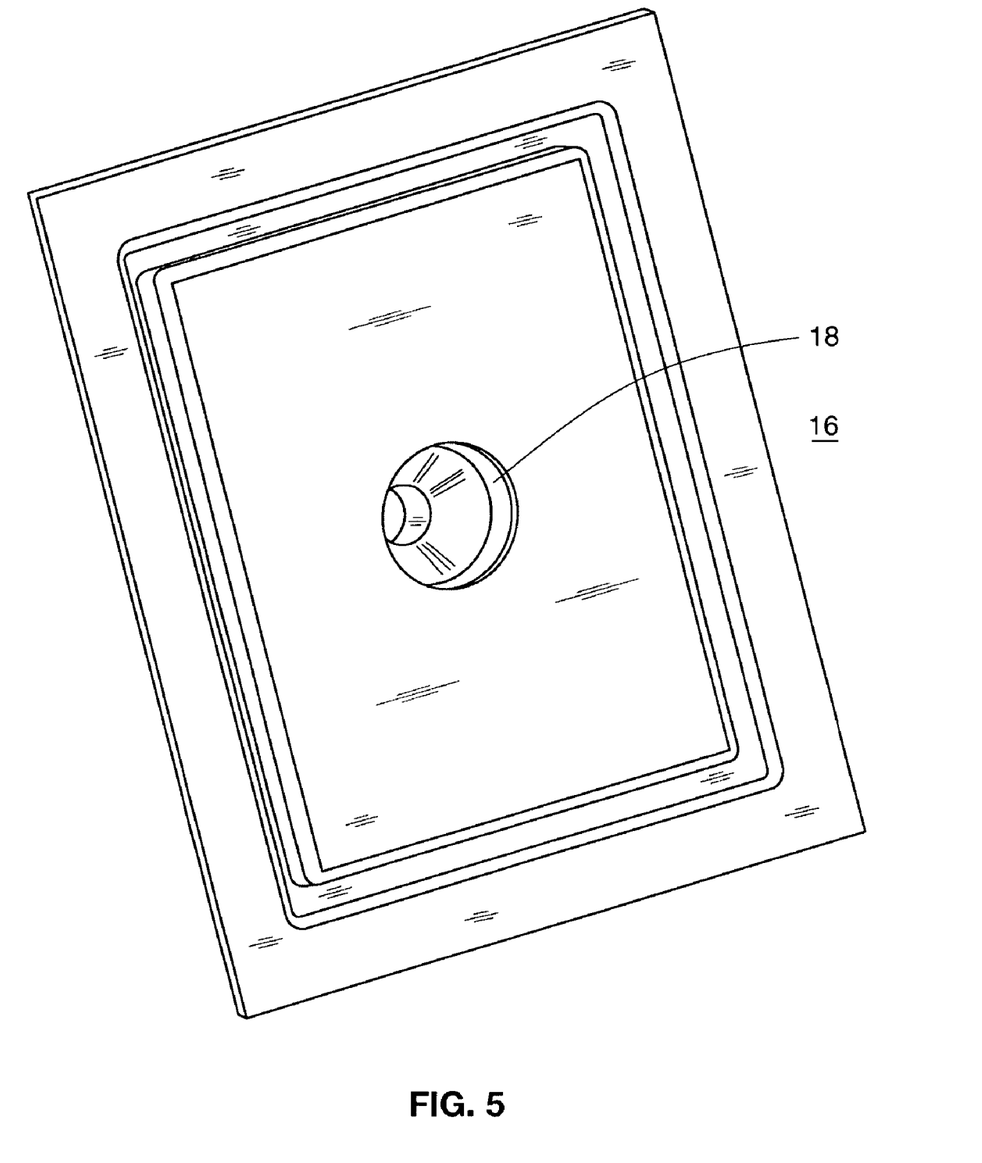
FIG. 5 is a perspective view of a tank lid constructed according to the first embodiment of the invention.

FIG. 5 shows the lid 16. In the preferred embodiment, the lid 16 has an outlet 18. The internal pipe 17 is connected to the outlet 18. The outlet 18 may be sized and configured so that solid wastes may be pumped out of the lower chamber 28 through the internal pipe 17. In other embodiments, there may be multiple outlets and associated pipes for venting air above the grease, selectively removing lightweight grease from the upper chamber 26, and removing solids from the lower chamber 28.

Figure 6:
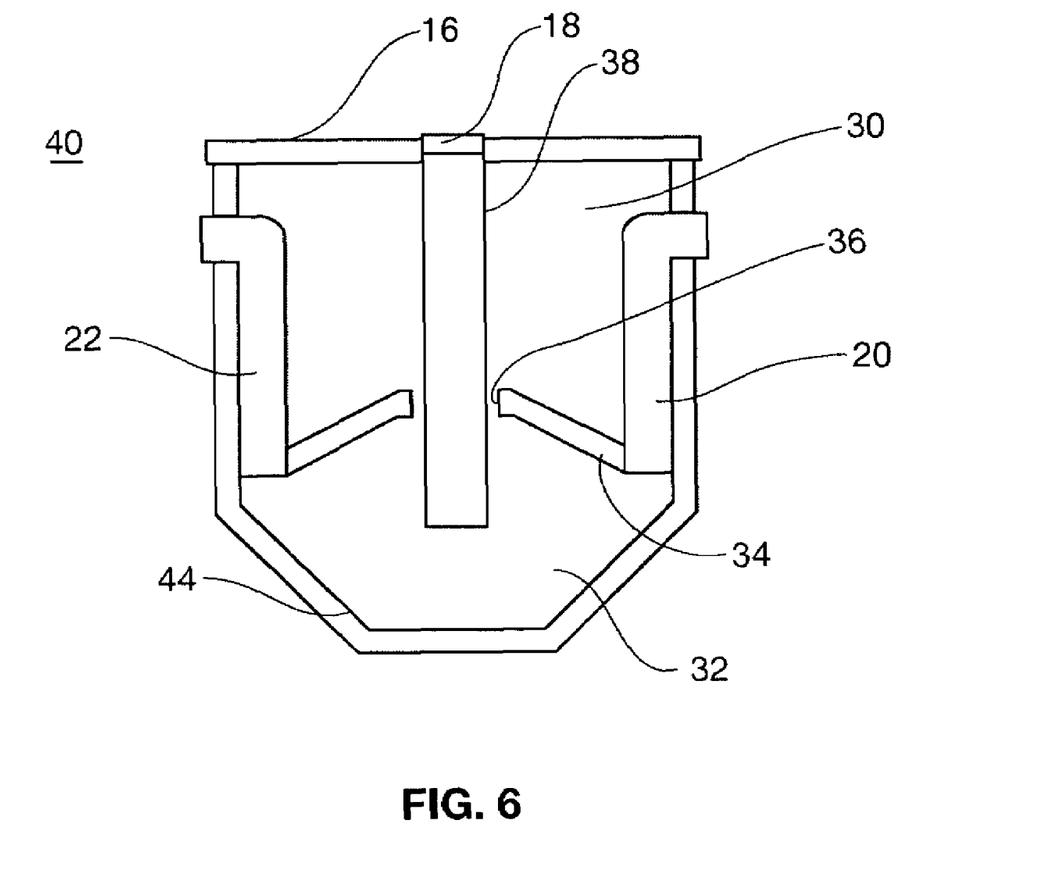
FIG. 6 is a cross-sectional view of a grease trap constructed according to the second embodiment of the invention.

An alternative embodiment of a grease trap 42 is seen in FIG. 6. The outer tank 42 may be divided into an upper chamber 30 and lower chamber 32 by an upwardly shaped divider 34. The upwardly shaped divided 34 may be welded into place or may be configured to slide and snap into place. As in other embodiments, the upwardly shaped divider 34 diverges from the downwardly shaped bottom 44, creating a space where the velocity of the water slows, allowing for greater separation. The lightweight greases that separate out of the waste water immigrate to the top of the lower chamber 32, and enter the upper chamber 30 via a hole 36 located in the upwardly shaped divider 34. The hole 36 is sized and configured to be larger in diameter than a pipe 38 that extends through the upper chamber 30, through the hole 36, and into the lower chamber 32. The pipe 38 extends to an outlet in the lid so that heavy solids that settle in the lower chamber 32 may be sucked out of the chamber.

Figure 7:
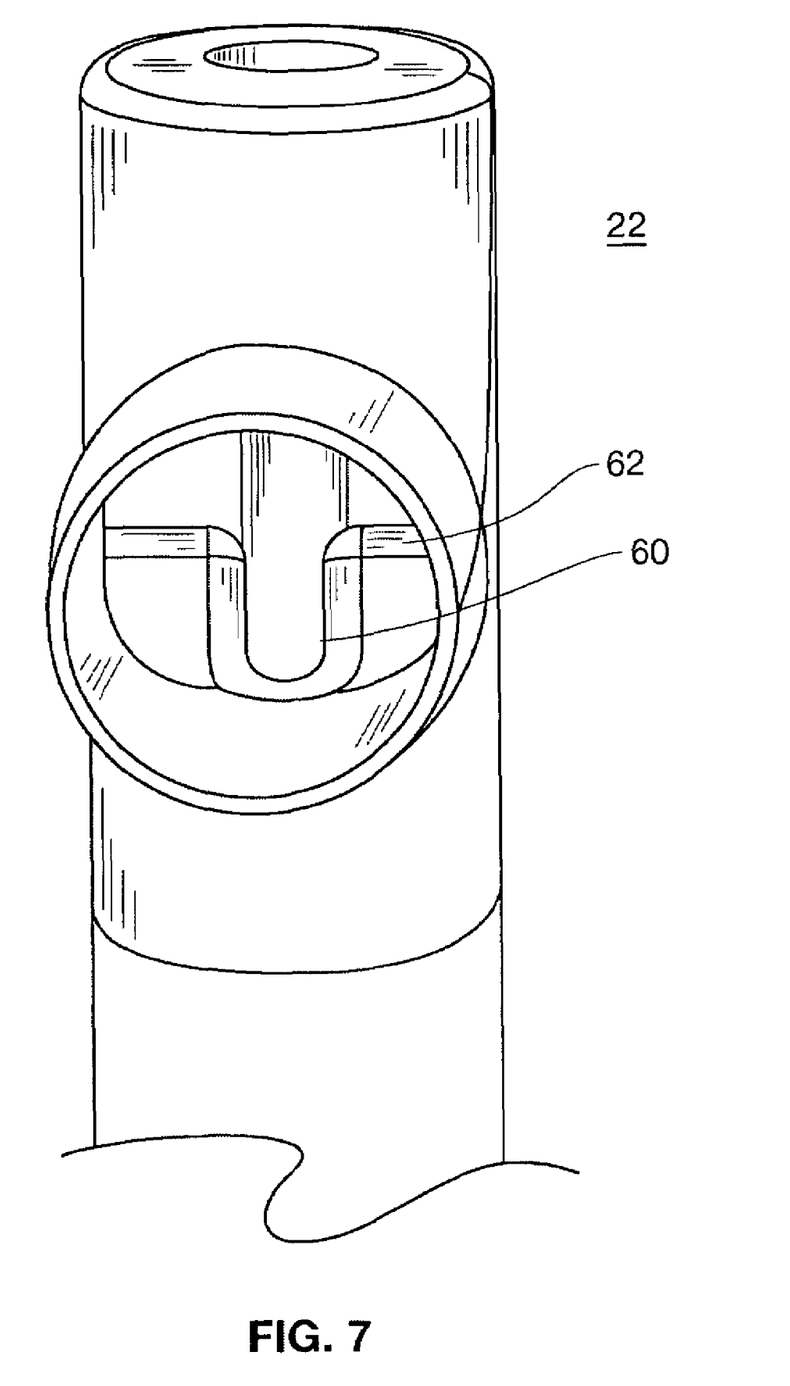
FIG. 7 is a view of the outlet invert showing the weep hole.

As seen in FIG. 7, a weep hole 60 may be positioned inside the outlet port of the outlet invert 22. The weep hole 60 is shown as a vertical slot in a weir 62, but could be a hole through a plate, with the hole being positioned at the bottom of the slot shown. The weep hole enables low flows of water to continuously exit the outlet invert and defines the static water level. If an in-rush of water to the grease trap occurs that cannot be accommodated through the weep hole, the water level rises until it overflows the weir 62. This raises the water level in the entire tank making an upward current through the hole 24 and, helping to force any lingering grease from near the hole 24 upward into the upper chamber.

Figure 8:
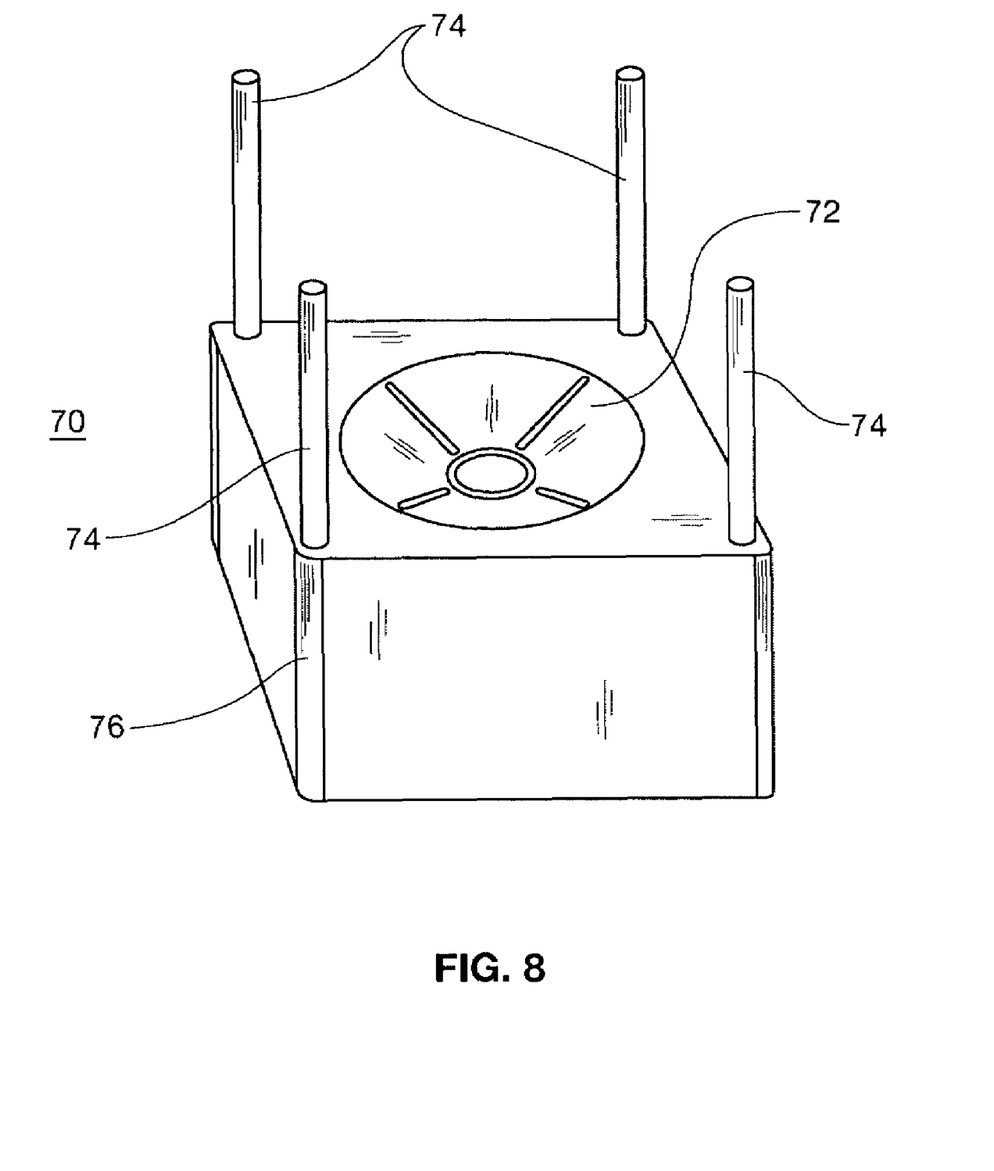
FIG. 8 is a view of a base for use in combination with the second embodiment of the invention.

The invention may also include a base 70 for installing the grease trap 10 as seen in FIG. 8. In a preferred embodiment, the base 70 may be a platform or block with a hole 72 in the center sized and configured to receive the downwardly shaped bottom of the outer tank of the grease trap. The base itself may be square, circular, or other shapes. The base may also include support rods 74 for supporting the top of grease trap. The support rods 74 also allow the grease trap 10 to be suspended from a ceiling. The base may include a stainless steel frame 76, as well.

Figure 9:
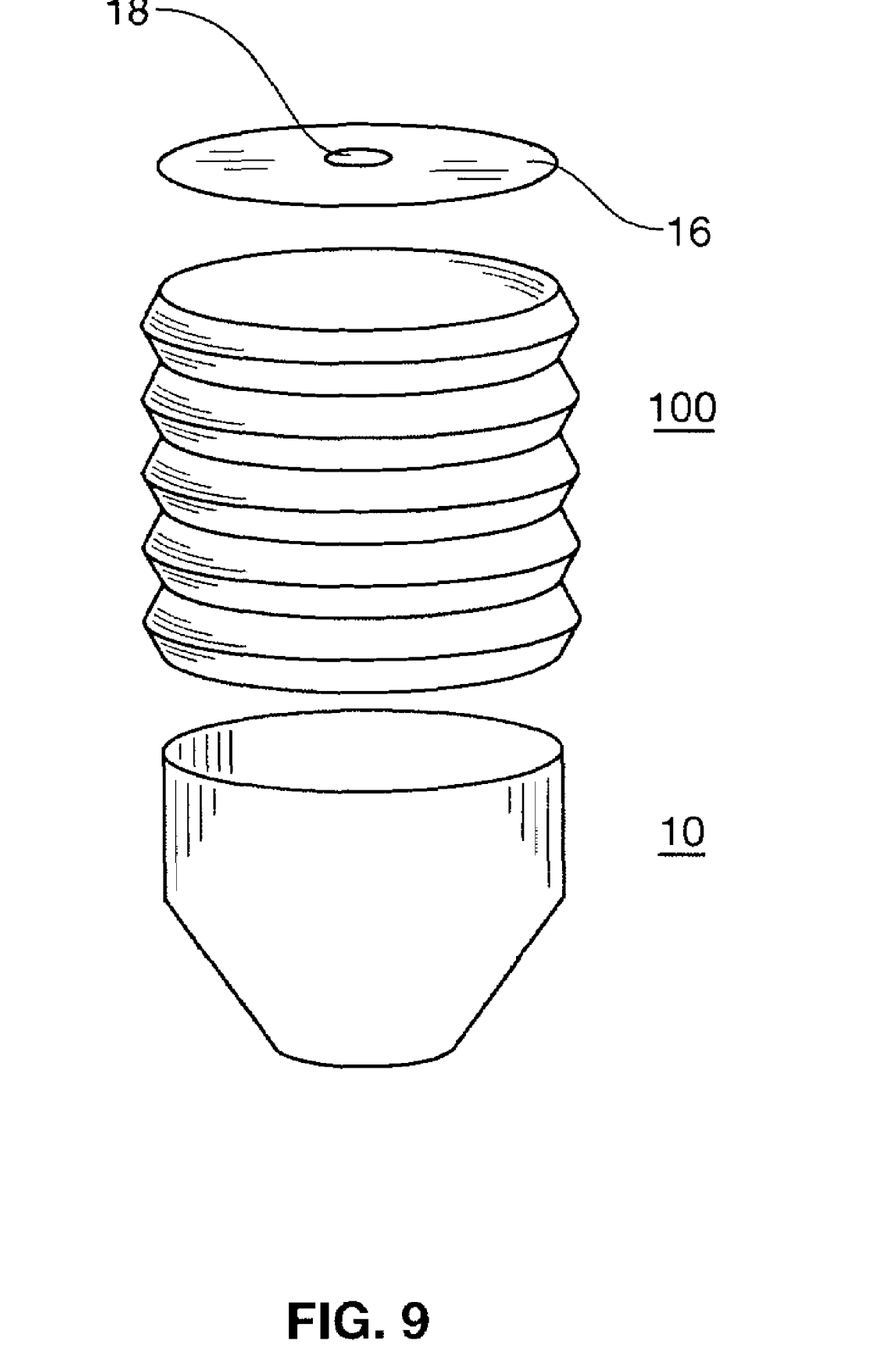
FIG. 9 is an exploded view of an embodiment of the present invention including a collar for adapting the grease trap lid for insertion in a floor.

Alternatively as seen in FIG. 9, the grease trap 10 may be recessed and suspended in a floor. A collar 100 may be placed between the lid 16 and the tank 10 to adjust where the top lies and enable removal of waste from the tank. The collar 100 may be similar to those used for manhole covers.

Figure 10:
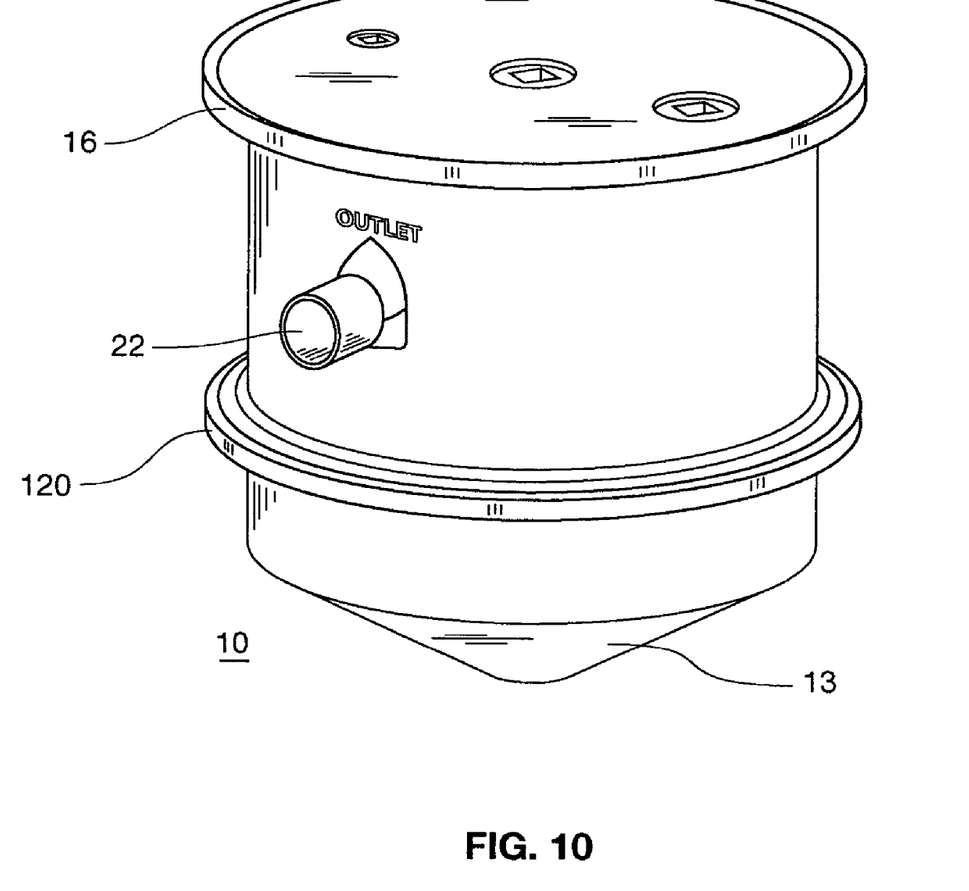
FIG. 10 is a perspective view of a third embodiment of the invention.

In an embodiment, as seen in FIG. 10, the grease trap 10 may include an anchor ring 120. If the grease trap 10 is buried in the ground, the anchor in the form of a ring 120 helps engage the surrounding soil and prevent the grease trap 10 from floating to the surface if water surrounds the grease trap 10. Anchors of other shapes or configurations may be substituted.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A grease trap for separating waste from waste water comprising
   a tank having a downwardly shaped bottom;
   an upwardly shaped divider dividing the tank into an upper chamber and a lower chamber, with a hole near or at an upper part of the divider, for allowing waste into the upper chamber;
   an inlet invert in the tank for receiving incoming waste water;
   an outlet invert for removing water from the tank;
   a lid covering the tank; and
   a pipe extending to the lower chamber for sucking solid waste out of the lower chamber.

2. A grease trap according to claim 1 wherein the tank is roto-molded plastic.

3. The grease trap according to claim 1 wherein the upwardly shaped divider is positioned above an inlet invert opening and an outlet invert opening.

4. The grease trap according to claim 1 wherein the upwardly shaped divider and the downwardly shaped bottom of the outer tank diverge so waste water entering the lower chambers encounters an enlarging volume.

5. A grease trap according to claim 1 wherein the upwardly shaped divider includes a sidewall suspending the divider from an upper part of the tank, thereby forming an inner tank.

6. A grease trap according to claim 1 wherein the pipe extends through the hole in the divider and the diameter of the hole in the divider is significantly larger than the diameter of the pipe to allow lightweight grease to flow into the upper chamber from the lower chamber.

7. A grease trap according to claim 1 further including a support base for installing the grease trap on a floor.

8. The grease trap according to claim 7 wherein the support base is sized and configured to receive the downwardly shaped bottom of the outer tank.

9. The grease trap according to claim 7 wherein the support base includes support rods extending upwardly from the base for supporting the grease tank.

10. The grease trap according to claim 1 wherein the outlet invert includes a weir with a weep hole.

11. The grease trap according to claim 1 further including a vent for venting gases from the grease trap.

12. The grease trap according to claim 1 further including an anchor for anchoring the grease trap when installed in ground.

13. A grease trap for separating waste from waste water comprising
   an outer tank having a downwardly shaped bottom;
   an inlet invert for directing waste water into the tank;
   an outlet invert for directing water from the tank;
   an inner tank having an upwardly shaped bottom having a hole therein and located within the outer tank so the bottom of the inner tank divides the outer tank into an upper and lower chamber; and a pipe extending through the upper chamber, the hole in the upwardly shaped bottom, and into the lower chamber, whereby grease and solids may separate from the waste water such that heavy solids fall to the downwardly shaped bottom and grease rises to enter the upper chamber through the hole in the upwardly shaped bottom and is sequestered from currents flowing from the inlet invert to the outlet invert, thereby preventing later mixing of sequestered grease into the water exiting the grease tank.

14. A grease trap for separating waste from waste water comprising an outer tank having a bottom;

an inner tank having a bottom having a hole located therein;

an inlet invert for receiving waste water;

an outlet invert for removing water from the tank; and a vertical pipe extending through the inner tank and extending into the outer tank for sucking solid waste out of the lower chamber.

15. The grease trap according to claim 14 wherein the bottom of the inner tank has an upwardly conical shape.

16. The grease trap according to claim 14 wherein the bottom of the inner tank has an upwardly pyramidal shape.

17. The grease trap according to claim 14 wherein the bottom of the inner tank divides the grease trap into an upper chamber and a lower chamber.

18. The grease trap according to claim 14 wherein the inlet invert and outlet invert lead into and out of the lower chamber, respectively.

* * * * *